(12) United States Patent
Schaefer

(10) Patent No.: US 8,414,978 B2
(45) Date of Patent: Apr. 9, 2013

(54) METHOD FOR FIXING IMAGES IN PLASTICS, ADHESIVE LAYER, AND FIXED IMAGE

(75) Inventor: Konstanze Schaefer, Berlin (DE)

(73) Assignee: Coyando GmbH, Berlin (DE)

( * ) Notice: Subject to any disclaimer, the term of this patent is extended or adjusted under 35 U.S.C. 154(b) by 0 days.

(21) Appl. No.: 12/667,063

(22) PCT Filed: Jun. 30, 2008

(86) PCT No.: PCT/EP2008/005557
§ 371 (c)(1),
(2), (4) Date: Jul. 7, 2010

(87) PCT Pub. No.: WO2009/003727
PCT Pub. Date: Jan. 8, 2009

(65) Prior Publication Data
US 2010/0291331 A1    Nov. 18, 2010

(30) Foreign Application Priority Data
Jun. 29, 2007 (DE) .......... 10 2007 031 121

(51) Int. Cl.
*B05D 3/00* (2006.01)
(52) U.S. Cl.
USPC ........... 427/333; 427/337; 427/340; 427/384; 427/407.1
(58) Field of Classification Search .............. None
See application file for complete search history.

(56) References Cited

U.S. PATENT DOCUMENTS

| | | | |
|---|---|---|---|
| 3,617,326 A | 11/1971 | Zuber et al. | |
| 4,490,410 A | 12/1984 | Takiyama et al. | |
| 6,402,331 B1 | 6/2002 | Juraschek | |
| 6,548,128 B2 * | 4/2003 | Auld et al. | 428/13 |
| 6,818,255 B1 | 11/2004 | Zimmer et al. | |
| 2004/0258889 A1 * | 12/2004 | Julius | 428/195.1 |

FOREIGN PATENT DOCUMENTS

| | | |
|---|---|---|
| AT | 268334 B | 2/1969 |
| DE | 198 29 242 A1 | 1/2000 |
| DE | 199 42 055 A1 | 3/2001 |
| DE | 200 17 119 U1 | 1/2002 |
| DE | 696 20 782 T2 | 10/2002 |
| DE | 698 05 507 T2 | 1/2003 |
| DE | 698 20 120 T2 | 9/2004 |
| DE | 103 27 453 A1 | 1/2005 |
| DE | 600 18 808 T2 | 4/2006 |
| DE | 10 2004 049 592 A1 | 5/2006 |
| EP | 0 858 913 A1 | 8/1998 |
| EP | 1 080 933 A2 | 3/2001 |
| EP | 1 186 435 A1 | 3/2002 |
| EP | 1 188 570 A2 | 3/2002 |
| EP | 1 317 347 A1 | 6/2003 |
| EP | 1 464 512 A2 | 10/2004 |
| EP | 1 647 399 A2 | 4/2006 |
| GB | 1 487 969 | 10/1977 |
| GB | 2 077 661 A | 12/1981 |
| WO | 96/21701 A2 | 7/1996 |
| WO | 01/43978 A1 | 6/2001 |
| WO | 03082595 A1 | 10/2003 |
| WO | 2004037556 A1 | 5/2004 |

* cited by examiner

*Primary Examiner* — Erma Cameron
(74) *Attorney, Agent, or Firm* — Sughrue Mion, PLLC

(57) ABSTRACT

A method for fixing images in plastic moldings which allows images to be fixed in a plastic molding in such a way that the image is embedded therein and does not experience lasting changes, even for elastic plastic moldings. To avoid loss of image quality when the image is transferred into the plastic molding, the method for fixing images in plastic moldings after generating an image on an adhesive layer is characterized in that an image receptor layer of liquid plastic is applied to the image which, with or without an additional carrier, is generated on the adhesive layer. Components of the adhesive layer are at least partially miscible with the liquid plastic when it is applied. The liquid plastic phase is then converted to a solid plastic phase.

26 Claims, No Drawings

METHOD FOR FIXING IMAGES IN PLASTICS, ADHESIVE LAYER, AND FIXED IMAGE

This is a national stage entry of International Application PCT/EP2008/005557, with an international filing date of Jun. 29, 2007, which was published under PCT Article 21(2) in German, and the complete disclosure of which is incorporated into this application by reference.

FIELD AND BACKGROUND OF THE INVENTION

The invention relates to a method for fixing images in plastics, an adhesive layer, and a fixed image.

The quality of printing methods, in particular digital printing, has drastically improved in recent years. It is possible to produce high-quality photorealistic images, and also to quickly and easily provide other illustrations.

In particular for digital printing, in the future conventional, commercially used printing techniques will find increasing use and also gain tremendous importance in these sectors.

A difficulty heretofore for use of printing techniques in the commercial sector (for example, the design, telecommunications, automobile manufacturing, shipbuilding and aircraft construction, and packaging materials industries, etc.) is the direct transfer of an image to a plastic surface and fixing the image. This problem may be solved in a fairly satisfactory manner using current techniques, but presently there is no known method that fixes images in plastics in such a way that the plastics are thermoplastically deformable to a great extent or even elastically stretchable. Thus, currently there is also no known method that is able to satisfactorily fix images in elastic plastic polymers.

In addition, there are no known methods in which the information in an image is divided over several levels in the plastic, resulting in three-dimensionality. By use of such a method, production of three-dimensional images or veneers, for example, or also applications in model construction would be possible.

However, a method which allows plastics to be imprinted with images at the very beginning of a production line, and only then to further process same (deep-drawing, thermoforming, stretch blow molding, blow molding, etc.), would offer a number of advantages. On the one hand, such a process allows completely new design possibilities for products. Images may be deformed or stretched in three dimensions, and the image may also be easily adapted to complex shapes. A good design is vital for a product. On the other hand, the production costs are significantly reduced by use of the described method. In this manner it is often possible to avoid costly injection molding processes, and also to economically realize lower quantities. Further advantages of this method are the ease of recycling the products, since no composite materials are produced. In addition, as a rule the adhesive layers may be imaged with inks/pigments containing water, and pigments containing solvent are not necessary.

The image transferred to a plastic should have the following properties, in particular for further processing in commercial sectors:
 The transfer should be inexpensive and relatively simple
 The image should be resistant to abrasion
 The image should behave as a part of the plastic itself during elastic stretching or in plastic deformation processes, and be able to completely follow the motion dynamics of the plastic; it should not tear when stretched, and should not experience damage under stress In the transfer of an image to a plastic, the absolute minimum number of additional layers of other plastics or materials should be necessary, and these should subsequently remain on the image in order to produce bodies that are relatively homogeneous with respect to materials.

For transferring digital images, for example, to the surface of solid plastics a number of processes have been developed, which may be roughly divided into three groups:

1) In the manufacture of a composite system (DE 102004049592 A1, DE 103 27 453 A1, EP 1647399 A2) ink jet print is first transferred to a system of various films, and the film composite is adapted to the desired shape and then back-molded with plastic.

2) In other processes the ink jet print is directly applied to a plastic surface. There are various methods for this purpose, having the common feature that high temperatures and/or high pressure or assistance from other agents are necessary. These processes are distinguished in that either an entire film imprinted with digital printing is placed on the plastic, or that only a specific layer of a printed film is transferred to the plastic. In many cases it is necessary to apply a further protective layer to protect the digital image from mechanical influences such as abrasion, for example (EP 1464512 A2, EP 0858913 A1, DE 60018808 T2, DE 69620782 T2, EP 1188570 A2, DE 69820120 T2, DE 69805507 T2, and others of Class B41M 5/035). According to the method described in WO 2004/037556 A1 the digital image is printed on a layer situated on a temporary substrate. At the same time, the surface of the plastic workpiece to be imprinted is modified so that it is adhesive, and the digital image may be held by means of adhesion forces when the temporary substrate having the printed layer is pressed onto the plastic to be imprinted. The layer having the digital image is detached from the temporary substrate and remains on the pretreated plastic surface. The temporary substrate may be removed from the workpiece. This method as well usually requires a further protective layer.

3) A third possibility lies in the use of inks which initiate a reaction on the workpiece to be imprinted, resulting in fixing of the inks; sublimation inks have a plastic component as the binder. The digital print is first imprinted on a siliconized carrier layer, and then with the use of pressure and fairly high temperature is fused onto the plastic in a transfer press, and the plastic component of the ink melts and bonds with the plastic of the workpiece to be imprinted. The intermediate carrier may then be removed (DE 20017119 U1, WO 03/082595 A1). Substrate-reactive digital printing represents a similar process U.S. Pat. No. 6,402,331). In this case functional groups of certain components in the ink react with functional groups of the workpiece surface, but this process is less suitable for transfer to plastic. A further variant is the use of inks containing a solvent as component which dissolves the surface lacquering of the surface to be imprinted, resulting in fixing of the pigments (EP 1080933 A2).

For transferring images and brand names to elastic objects, there are methods in which the surface of the objects to be imprinted is first pretreated and the surface is cleaned using various degreasing solvents. The surface is then further treated to prepare it for the imminent printing. A screen printing process is generally used for this purpose (DE 19829242 A1, U.S. Pat. No. 3,617,326, and others). An image imprint on a stretched object is also possible (GB 2077661 A, and others). Photorealistic digital printing on a low-ductility material coated with latex is described in WO 96/21701. In this method the inks contain latex components. However, in this patent it is noted that the image is not particularly resistant when heated or when cleaning agents are used, which once again points out the basic problem of digital printing on elastic workpieces.

Transfer of printed images to various levels within a molding made of plastic has not been described heretofore. The superimposition of composite systems would create a nonhomogeneous object, resulting in optical defects. Other known methods for applying digital images would likewise impair the homogeneity of the plastic due to the use of adhesive layers composed of another material (different plastic layers converted by sublimation).

OBJECTS AND SUMMARY OF THE INVENTION

The object of the invention is to provide a method for fixing images in plastic moldings which allows images to be fixed in a plastic molding in such a way that the image is embedded therein and does not experience lasting changes, even for elastic plastic moldings. The intent is to avoid loss of image quality when the image is transferred into the plastic molding.

The object is achieved by use of a method for fixing images in plastic moldings after generating an image on an adhesive layer, characterized in that an image receptor layer of liquid plastic is applied to the image which, with or without an additional carrier, has been generated on the adhesive layer, and components of the adhesive layer are at least partially miscible with the liquid plastic when it is applied, and the liquid plastic phase is then converted to a solid plastic phase. "Miscibility" is also understood to mean that the components of the adhesive layer are bonded, in the broadest sense of the term, to the liquid plastic phase by molecular interactions.

The object is further achieved by use of an adhesive layer on which images may be generated, containing components based on hydrophilic and/or hydrophobic plastics which may be brought into the liquid phase.

Advantageous refinements are stated in the subclaims.

DETAILED DESCRIPTION OF EXEMPLARY EMBODIMENTS

One embodiment of the method according to the invention is characterized in that the image receptor layer of liquid plastic is applied to the image generated on the adhesive layer, and after a contact time of at least one second this liquid plastic phase is converted to a solid plastic phase.

Advantageous refinements of the method are characterized in that a plastic melt or a liquid, curable plastic is applied.

One embodiment of the method according to the invention is characterized in that a liquid plastic containing a solvent or solvent mixture is applied.

A further embodiment of the method according to the invention is characterized in that a liquid plastic containing hydrophilic or hydrophobic solvents is applied.

One refinement of the invention is characterized in that an additional carrier of the adhesive layer is removed after the image receptor layer is converted to the solid plastic phase.

One advantageous embodiment is characterized in that a volume of liquid plastic is applied which is at least as great as the volume of the adhesive layer.

In a further embodiment, after removal of the carrier a base layer of plastic is applied in its place.

In a further embodiment the base layer is applied as a liquid plastic phase.

A further embodiment is characterized in that the base layer is applied as a solid plastic phase.

In a further embodiment a composition of the adhesive layer is selected which enters into molecular interactions with the liquid plastic of the image receptor layer.

In one advantageous embodiment an adhesive layer is used which contains at least one component which is at least partially soluble in the liquid plastic phase and/or enters into a chemical reaction with the plastic.

One refinement is characterized in that commercially available polyester films having a bonding layer are used.

A further advantageous embodiment is characterized in that liquid duroplastic, thermoplastic, and elastomeric plastics or plastic mixtures are applied which after the conversion to the solid plastic phase have transparent, nontransparent, translucent, or opaque optical characteristics and/or are colored.

Further embodiments of the method are characterized in that polyurethanes; a mixture of polyurethane and silicones; epoxides and polyester; aqueous polymer dispersions; polycarbonates; or polyethylene, polypropylene, or polystyrene, or other polyalkylenes are used.

In a further embodiment, polymers from the group of acrylic compounds are used.

In one refinement of the method the carrier is not removed, and thus acts as a base layer.

One embodiment of the invention provides that the image receptor layer is applied as solid plastic to the image generated on an adhesive layer, and is then at least partially brought into the liquid phase.

The method according to the invention also provides that a plastic which may be melted by heating is used.

A further embodiment is characterized in that the solid plastic is laminated or extruded onto the adhesive layer as a film.

In one refinement the adhesive layer has a removable carrier. In one embodiment the adhesive layer contains surfactant substances such as tensides which advantageously facilitate the bonding of certain, in particular polymeric, components to the liquid plastic phase.

One embodiment of the adhesive layer is characterized in that modified natural polymers such as polymers based on cellulose or gelatin, as well as proteins, are contained as plastics.

The image which is fixed using the method according to the invention is characterized in that the plastic molding together with the image is elastically deformable without the image experiencing lasting changes during the deformation.

In one refinement the plastic molding bearing the fixed image has partially or completely transparent, nontransparent, translucent, or opaque optical characteristics and/or is colored.

The plastic molding may be a hollow body.

One embodiment of the method for fixing digital images in plastic moldings after a digital image is generated by digital printing on a carrier having a bonding layer is characterized in that an image receptor layer of liquid plastic is applied to a digital image generated on an adhesive layer, and after a contact time of at least one second this liquid plastic phase is converted to a solid plastic phase.

Conventional methods in which images are transferred to plastic are based on application, no matter what the type, of a layer bearing the image to a previously polymerized, hardened plastic surface. The image-bearing layer (often with the use of high pressure and/or high temperature) is incorporated into the surface pores of the plastic body. The image-bearing layer adheres due to adhesion forces which develop between two surfaces. However, the size of the adhesion surface is limited, which affects the quality of the adherence of the image. On the one hand the image is sensitive to abrasion. On the other hand, thermoforming processes or elastic stretching of the plastic workpiece are very difficult because the image would tear or come loose.

The present invention provides a simple possibility for embedding an image directly in a plastic molding and fixing the image therein without loss of quality. By use of this method the image is interlinked in the plastic in such a way that the image completely follows the motion dynamics of the plastic upon elastic stretching or thermoplastic deformation, and is also protected from abrasion. The image not only adheres to the plastic surface, but is also incorporated into the plastic molding, which accounts for the high quality of the bond.

This method has the following advantages in commercial applications:

The transfer of print onto or into a plastic body is carried out in an economical process.

The product generally represents a homogeneous material (material combinations are possible) which may be subjected to much more complex deformation processes without the occurrence of material stresses (such as with composite systems). The product may be twisted and stretched, for example, without destroying the image as the result of cracks.

A subsequent repouring with plastic may be carried out to produce a molding which has a complex design but which is composed of a preferably homogeneous material. Fields of application are represented by model construction, for example.

Some plastic products are subjected to high mechanical stresses after manufacture, for example when used as substitute uppers in the shoe industry. In this case the materially homogeneous product according to the invention (comprising an upper structure and a lower print layer) is particularly advantageous, since during continual buckling, stretching, and bending, material stresses between the layers cannot result in defects in the image.

An image may be generated on an adhesive layer according to the invention by printing with water-soluble printer inks, and requires no solvent-containing printer inks or addition of specific components to the printer ink.

A further advantage over composite materials is that the plastic together with the print may first be produced in one step and only then punched, cut, sawed, etc., and lastly (generally thermoplastically) deformed. The costly injection molding process is thus avoided.

By dividing specific image information in an image over superposed levels it is possible to produce spatial images with a three-dimensional character, which may be used, for example, in the design of veneers, in image display, or also in model construction.

In other known methods the digital print is transferred to plastics only on the surface. The qualitative difference compared to these other methods becomes apparent from the following listed items:

1) The adherent surface is greatly enlarged compared to other methods.

During polymerization of the still liquid plastic or during hardening of the plastic melt on the image-bearing adhesive layer, the macromolecules of the liquid polymer pass into extremely fine interstices in the adhesive layer having the image incorporated therein.

In this method very small adhesion events are achieved in a large overall density, so that stresses occurring between the image and the plastic surface may be distributed consistently and uniformly over the entire adherent surface. The image transferred to the image receptor layer shows no cracks or other damage, even under high mechanical stress.

2) The polymer molecules (particularly those of the duromers) are able to react to molecular interactions and electrostatic forces in the image-bearing adhesive layer and to become correspondingly oriented and aligned in the macromolecular structure. Covalent bonds, ionic bonds, or electrostatic forces result in strong connections between the adhesive layer and the plastic macromolecule.

3) Introduction of a liquid, for example an incompletely polymerized polymer (duromers, elastomers) or a molten polymer (thermoplasts), into the adhesive layer results in molecular interlocking with the image-bearing particles, which in particular for stretching processes allows the image to follow the motion dynamics of the plastic.

Polymers which may be used for this invention are incompletely polymerized (generally prepolymerized) polyurethanes and many polyurethane compounds in which the polyurethane portion predominates (including polyurethane/silicone compounds).

Also well suited for this method are epoxy resins and epoxy resin compounds in which the epoxy resin portion predominates. Polyurethane resins as well as epoxy resins polymerize by polyaddition.

Thermoplastic plastics are also suitable.

In principle, the method according to the invention may be used to transfer an image to transparent, translucent, or opaque plastics as well as to nontransparent or colored plastics. Transparent, and under some conditions also translucent, plastics are suitable for image receptor layers above an image; nontransparent, opaque, translucent, and colored plastics are suitable for base layers beneath an image.

The image may be transferred to an adhesive layer which is detachably fixed to a carrier.

The image may also be transferred to an adhesive layer which is nondetachably fixed to a carrier (base layer), so that the carrier represents a protective layer for the image, for example as anti-scratch protection for the plastic phase. The image may also be transferred to an adhesive layer which is not fixed to a carrier.

The carrier for an adhesive layer is preferably a film, the film being composed of a film-forming plastic or some other material that is usable for film formation. For the method described here, a carrier composed of polyester has preferably proven to be advantageous, since it maintains resistance even at high temperatures. Polyurethanes, epoxy resins, and compounds thereof may be satisfactorily detached by peeling from this substrate composed of polyester.

Films composed of polymer mixtures are also used as carrier. The thickness of the carrier film (with the adhesive layer thereupon) is preferably approximately 40 to 200 µm. However, it may also be thinner, or much thicker.

Image-bearing adhesive layers are known. However, the adhesive layers according to the invention contain plastics which may be brought into the liquid phase, and with which the liquid macromolecules of the image receptor layer may interact. The adhesive layer also preferably contains hydrophilic fillers (limestone, silica gel, alumina, cellulose powder, and the like), and possibly detergents which facilitate the penetration of hydrophilic inks (color, pigments) or other hydrophilic imaging particles into the adhesive layer. However, the adhesive layer may also contain other types of fillers, for example fillers of a hydrophobic nature, which are suitable for hydrophobic printer inks. The composition of the adhesive layer is such that, after it bonds to the image receptor layer, it may be easily detached from its carrier, for example by peeling.

The following are examples of suitable hydrophilic plastics which may be brought into the liquid phase, which are suitable as components of the adhesive layer, and which are able to interact with the plastics of the image receptor layer:

Cellulose derivatives: carboxymethylcellulose, acetylbutyryl and propionyl groups, ethylcellulose, hydroxyethylcellulose, hydroxymethylcellulose, hydroxypropylmethylcellulose, methylcellulose and derivatives, nitrocellulose, celluloid Polyethylene oxide Hydrolyzed plastics (for example, hydrolyzed polyethylene, hydrolyzed polyacrylonitrile)

Gelatin derivatives: collagen (starting product), fractionated gelatin, collagen hydrolysate, elastin hydrolysate, and other gelatin derivatives Polymers based on gelatin Elastomers based on gelatin Other organic framework-forming agents composed of hydrophilic macromolecules or surfactant macromolecules Other hydrophilic-hydrophobic hybrid materials containing polar solvents and surfactant compounds Printable plastics (hydrophilized plastics or plastics having a porous surface or low surface tension)

Polyvinyl butyral (PVB) and PVB blends

Hydrophilic fillers

Alkyl(meth)acrylamides

The weight fractions of the hydrophilic adhesive layer components are between 100% (for a pure cellulose-2-acetate layer, for example) to approximately 30% (polybutyral in PVB blends, for example), and are preferably between 60% and 40%.

Methylcellulose and derivatives thereof may be imprinted with water-soluble pigments/inks (and also with hydrophobic pigments/inks). At the same time, they are able to interact with crosslinking polymers, and molten thermoplasts may also penetrate into their structure. They may act as an adhesive layer, singly or in polymer combinations, with or without additives (soluble in water).

Cellulose-2-acetate and derivatives thereof (for example, acetylbutyryl celluloses or celluloses containing propionyl groups) may be imprinted with water-soluble (and also hydrophobic) pigments/inks. At the same time, in combination with thermoplastic compounds they are able to form other plastic polymers, and are thermoplastically deformable. They are ductile, which is important for processing with silicones. They may act as an adhesive layer, singly or in polymer combinations, with or without additives (soluble in acetone).

Nitrocellulose and derivatives thereof may be imprinted with water-soluble (and also hydrophobic) pigments/inks. At the same time, they are able to interact with crosslinking polymers, and molten thermoplasts may also penetrate into their structure. They may act as an adhesive layer, singly or in polymer combinations, with or without additives (soluble in organic solvents).

Polyethylene oxides may be imprinted with water-soluble (and also hydrophobic) pigments/inks. At the same time, in combination with thermoplastic compounds they are able to form other plastic polymers, and are thermoplastically deformable. They are also able to interact with polyurethanes, epoxy resins, and other duroplasts during polymerization. They may act as an adhesive layer, singly or in polymer combinations, with or without additives (soluble in water).

Modified types of gelatin have surfactant properties and may be imprinted with water-soluble (and also hydrophobic) pigments/inks. At the same time, they are able to interact with crosslinking polymers, and molten thermoplasts may also penetrate into their structure. Stresses resulting from heating of gelatin films may be eliminated by adding mixtures (glycerin, for example). Gelatin acquires rubberlike properties by treatment with formaldehyde in formamide, which is important for processing with silicones. Gelatin solutions are able to wet various plastics without problems (acrylic, polyethylene terephthalate, polyethylene, propylene, for example). Gelatin membranes composed, for example, of gelatin, glycerin, polyethylene glycols, and esters thereof are possible.

Gelatins may act as an adhesive layer, singly or in polymer combinations, with or without additives (soluble in water, nonaqueous solutions of gelatin, for example in acetic acid, with addition of electrolytes and water in acetone and alcohol, in benzenesulfonic acid, polyhydric alcohols).

Polymers based on gelatin which may be used as adhesive layers:

Gelatin acts as a polyfunctional amine in curing processes for macromolecules containing OH and $NH_2$ groups.

Gelatin may also be copolymerized with water-soluble polymers. Various other copolymers are obtained from gelatin together with methyl, ethyl, or butyl acrylate, vinyl acetate-methyl methacrylate, styrene-methyl methacrylate, and acrylonitrile.

Thermoplastic polymers are prepared from raw gelatin, aniline, and formaldehyde.

Gelatin is copolymerized with phenol formaldehyde resins, polyvinyl chloride, acrylonitrile, and others.

Styrene and methyl methacrylate may be polymerized in the presence of gelatin.

Water-soluble redox polymers are prepared by treating the gelatin with benzoquinone derivatives and reacting with diisocyanates.

Gelatin is processed with polyurethanes by polymerization of polyisocyanates with gelatin-containing polyols.

Gelatin resins may be prepared via condensation reactions (for example, condensation of gelatin and maleic anhydride). Gelatin is reacted with formaldehyde for application as a layer on textiles.

Porous gelatin coatings for textiles are prepared by using gelatin together with tetrahydronaphthalene, an emulsifier, ammonium caseinate, hydrochloric acid, and zinc oxychloride.

The following are elastomeric polymers based on gelatin which may be used as adhesive layers:

Melt mixtures of gelatin with water, which are mixed with glycerin.

Introduction of sulfur-containing groups into the gelatin protein likewise results in rubberlike products.

The reaction of gelatin with dibasic acids and polyols likewise results in an elastomeric polymer.

Rubberlike polymers may be prepared by treating the gelatin with an acid or base, and then with dimethyl sulfate and cresol.

Similar elastomers result from the treatment of gelatin with sulfur and dichloroethylene and coagulation of the product with phenol and a tanning agent.

Butadiene acrylonitrile rubber and raw gelatin are mixed with surface treatment agents, likewise resulting in a gelatin elastomer.

Polyvinyl Butyral (PVB) as Elastomer with Hydrophilic Properties

Because it contains OH groups, polyvinyl butyral is able to accept hydrophilic (and also hydrophobic) pigments/inks. Polyvinyl butyral has strong adhesive properties, and also bonds to plastics. PVB is particularly suited for adhesive layers whose image receptor layer is composed of silicones or other elastomers. PVB may act as a pure layer or as a polymer mixture with other plastic polymers (for example, a mixture of polyvinyl butyral, polymethyl methacrylate, and thermoplastic polyurethane).

Also suited are plant proteins, plant protein hydrolysates, and mixtures thereof, as well as plant molecules and mixtures thereof, and plant molecules composed of polysaccharides (for example, lignin with or without surfactants, hemicellulose with or without surfactants, starch compounds with or without surfactants), as well as animal proteins, animal protein hydrolysates, and mixtures thereof (for example, casein formaldehyde, keratin polymers).

Hydrophilic-hydrophobic hybrid materials containing polar solvents and surfactant compounds Organosiloxane-polyglycol copolymers (for example, polyglycol-siloxane copolymers in a mixture with various surfactants or surfactant mixtures).

Polyvinyl alcohols may preferably be used as water-soluble resin having vinyl alcohol units; these polyvinyl alcohols may be partially modified by acetalization, butyralization, or the like.

The water-soluble or water-dispersible resins that are used, having an aromatic polyester unit, are preferably composed of aromatic dicarboxylic acid compounds and aliphatic diol compounds containing functional ionic groups in the molecule.

The binder also contains a low-molecular compound having a reactive group of higher functionality which enhances the crosslinking properties of the binder.

The following are examples of hydrophobic plastics which may be brought into the liquid phase and which are suitable as components of the adhesive layer according to the invention:
Acrylonitrile butadiene styrene (ABS)
Polyamide (PA)
Polycarbonate (PC)
Polystyrene (PS)
Polyvinyl chloride (PVC)
Thermoplastic polyurethanes (TPU)
Acrylonitrile styrene acrylate (ASA)
Polybutylene terephthalate (PBT)
Polyethylene terephthalate (PET)
Polyethylene (PE)
Polypropylene (PP)
Ethylene propylene terpolymer (EP(D)M)
Polyphenylene oxide (PPO)
Polyvinyl butyral (PVB)
Polymethyl methacrylate (PMMA)

The weight fractions of the hydrophobic adhesive layer components are between 0% (for a pure methylcellulose layer, for example) and 70% (nonhydrophilic components in polymer blends), and are preferably between approximately 40% and 60%.

Some plastic polymers (for example, cellulose acetate, polyethylene oxide, gelatin polymers, and others), which are able to bond with the plastic of the image receptor layer and also accept hydrophilic pigment, may be used as a homogeneous adhesive layer. However, they may also be combined with other polymers.

Other adhesive layers that contain hydrophilic components which are not able to bond directly with the plastic of the image receptor layer require additional hydrophobic components which form the bond between hydrophilic components and the hydrophobic plastic of the image receptor layer.

These hydrophobic components are preferably composed of plastic particles (dissolved or in the form of a powder) having the same or similar properties as the plastic of the image receptor layer. These hydrophobic components may be composed of a single type of plastic, or also a plastic polymer mixture (polymer blends).

The following are examples of polymer blends used:
ABS blends with PA, PC, PVC, TPU
ASA blends with PC, PVC
PC blends with PBT, PET
PS blends with PE
PP blends with EP(D)M
PPO blends with PS, PA
PVB blends with PMMA and TPU and others.

In addition, surfactants, softeners, and other additives are used in adhesive layers to improve the properties:

Compounds containing hydrophilic cationic, anionic, or amphoteric and nonionic groups and containing hydrophobic groups such as alkyl or aryl components are used as surfactants. In addition, nonionic surfactants such as ethylene oxide, fatty acids, or polyglycerin, or other surfactant nonionic representatives containing hydrophilic polyether chains or hydroxy groups may be used.

For better film formation, flow control agents such as high-boiling solvents, for example tetra- or decahydronaphthalene, may be used.

Low-viscosity or high-viscosity softeners such as dioctyl phthalate (di-2-(ethylhexyl)phthalate), polymers such as cellulose acetate, polyurethanes, phenol resins, etc., or sulfonamides are sometimes necessary to improve film formation of the hydrophobic adhesive layer components.

White pigments such as titanium oxide, barium sulfate, or calcium carbonate, for example, may be incorporated into the adhesive layer.

The following are examples of coating processes for applying the adhesive layer to a carrier:
Compressed air spraying
Airless spraying
Electrostatic spraying
Strip coating
Dip coating
Letterpress printing
Laser spraying
Laser coating
Offset printing
Powder coating
Thermal spraying
Rotogravure printing
Blade coating, air blade coating
Roller coating
Extrusion
Lamination Adhesive layers on polyester carrier films (substrates) are known and commercially available.

Peeling of the carrier for the adhesive layer from the adhesive layer in the polymer of the image receptor layer is generally performed at room temperature.

Problems resulting from faulty peeling may be eliminated by prior cooling of the image receptor layer, together with the adhesive layer and carrier, to a temperature in the range of 4° C. to 8° C.

Peeling represents a failure of the adhesive forces between the adhesive layer and the carrier. The peeling itself may be performed by machine or by hand.

Peeling angles less than 45° have proven to be unsuitable. Very good results are obtained with peeling angles of 90° and greater, although peeling angles up to 180° are also possible.

In many cases the temporary carrier removed by peeling may be reused with proper handling. Reuse is problematic if deformations result in nonplanar surfaces, if the temporary carrier becomes brittle through frequent use, or if parts of the adhesive layer have not completely dissolved in the image receptor layer.

The image to be incorporated into a plastic molding is first applied to the adhesive layer, preferably by ink jet printing with water-soluble inks or another suitable method. It is important that, as the result of the selection and matching of the components (hydrophilic and/or hydrophobic polymers) of the adhesive layer and the plastic of the image receptor layer, molecular interactions are initiated between the image-bearing adhesive layer and the liquid image receptor layer.

For example, a still liquid, incompletely polymerized plastic polymer of an image receptor layer is poured onto the adhesive layer. According to the invention, this (generally prepolymerized) plastic polymer may be a polyurethane resin or polyurethane resin mixture with a predominant polyurethane fraction, or also a polyurethane foam. The plastic polymer may also be an epoxy resin or epoxy resin mixture with a predominant epoxy resin fraction.

Polyurethane compounds as well as epoxy resin compounds polymerize by polyaddition, which for the (generally prepolymerized) casting resins is initiated by mixing the polymer component with its corresponding hardening component in the appropriate ratio.

During mixing of the polymer and hardening components, preferably by stirring, air bubbles are disadvantageously introduced into the polymer which must be degassed under vacuum. After the polymer is applied to the adhesive layer bearing the digital image it is often necessary to once again use vacuum to remove air bubbles that develop. Until the image receptor layer has completely hardened, the adhesive layer therebeneath should remain horizontal, without inclination, to ensure a uniform thickness of the polymerizing layer.

During hardening of the image receptor layer the area should be relatively free of floating dust particles, which otherwise may settle on the smooth surface facing away from the adhesive layer and contaminate same. It is helpful, but not absolutely necessary, to delimit the adhesive layer bearing a digital image by use of a stencil to prevent the still liquid polymer from flowing out.

The dropping times of polyurethane plastics are generally 20 minutes, and the hardening times, two hours. These times may be greatly shortened by using specific additives, which is of particular importance in the commercial sector. The dropping times of epoxy resins are shorter, and their hardening time is one hour, although this time may be further shortened.

After the plastic has hardened, the carrier for the adhesive layer which is then bonded to the image receptor layer may be removed by peeling. If the image and adhesive layer are not water-soluble, this plastic may be sent to further processing, such as cutting to size or punching and subsequent thermoplastic deformation, provided that the polymer is not fully hardened, or thermoplastic polyurethanes (TPU) are not involved.

If water-soluble inks and a hydrophilic adhesive layer have been used, a second polymer layer (base layer) on the side exposed by the carrier is advantageous to protect this side from moisture. This polymer layer is applied in a similar manner as for the first polymer layer. A second polymer layer of the same type of plastic is advantageous to prevent material stresses or unsatisfactory bonding at the interface between the two layers under mechanical, thermal, or other loads. However, polymer combinations are possible. In the production of blends it is important to ensure that the types of plastic used have similar properties.

After application of a second protective layer the molding may likewise be sent to further processing.

Polyurethane plastics have extremely versatile properties, ranging from thermoformability to rigid elasticity to steel-hardness. As a rule, a few hours up to several days after hardening, solid plastics made of polyurethane may be stretched, twisted, bent, or otherwise deformed before hardening is fully complete. The hardening may be achieved earlier by resintering at 80° C.

Epoxy resins form solid plastics which generally are not thermoformable.

Polyurethane plastics bearing digital images may be easily plastically deformed into complex levels in three dimensions, and this structure may then be combined to form an extremely complex but materially homogeneous object by repouring into polyurethane (or another suitable material).

Specific image information of an image may be divided over multiple superposed levels of plastic to produce a spatial image with a three-dimensional character.

The invention is explained in greater detail with reference to the following exemplary embodiments.

Example 1

Production of a Solid, Thermoformable Plastic Having a Digital Image

A) Plastic Having a Fixed Digital Image and a Second Polymer Layer on the Reverse Side of the Digital Image:

The digital image is first transferred, right side up, to an adhesive layer situated on a temporary polyester carrier film. The polyester carrier film used is an F02 carrier film from Geha, coated on one side, for ink jet printers. The image, which is printed with an ink jet printer using water-soluble inks, must first be dried with hot air. The border of the temporary carrier film is delimited by a stencil to prevent the liquid plastic from flowing out.

Biothan 1784s polyurethane and its hardener Biodur 330 from Alpina GmbH are used as plastic. The polymer remains transparent and is not colored. To obtain a solid plastic, the polyurethane component and hardener component are mixed in a 1:2 ratio. This results in the incorporation of disadvantageous air bubbles. Before pouring onto the adhesive layer of the temporary carrier (substrate) the mixture must be degassed under vacuum. A vacuum chamber and a vacuum pump (2 mbar) are used for this purpose. After the incompletely polymerized polyurethane mixture is poured onto the adhesive layer bearing the digital image, degassing is performed once again under vacuum, using a vacuum chamber and a vacuum pump (0.2 mbar). It is also possible to perform only this second degassing and to omit the first degassing step.

During the polymerization of the image receptor layer it is important to keep the substrate on a completely flat, nonsloping surface so that the image receptor layer forms a layer of uniform thickness upon hardening. The surface should also be protected from floating dust particles to avoid contamination.

This polyurethane mixture requires approximately two hours for hardening. The temporary polyester carrier may then be removed by peeling from the adhesive layer bearing the digital image, which is interlinked with the image receptor layer. For this purpose the plastic is turned over and the carrier is peeled off. The resulting image receptor layer with digital print is used as the front side of a plastic article.

The digital image is present in the plastic acceptor layer, interlinked in the macromolecule. The digital image is able to follow any deformation, and does not tear when stretched. It is extremely smudge-resistant, but sensitive to moisture. (The digital image may also be present in moisture-resistant form when water-insoluble inks and a different adhesive layer are used.)

The second protective layer, applied to the side of the digital image exposed by peeling the temporary carrier, is preferably composed of the same polyurethane mixture used above. The polymer may preferably be dyed white or another color, or the polymer may remain transparent. Before being applied to the digital image the polymer is degassed under vacuum. After the pouring, degassing under vacuum is likewise performed; here as well it is possible to carry out only the second degassing step and to omit the preceding degassing step. To prevent the plastic from flowing out, here as well the borders are delimited by a stencil before the second plastic layer is poured in. In this case as well, it takes approximately two hours for the plastic to harden; during this time the surface should be protected from dust to the greatest extent possible.

The polymerization time for the polymer may be greatly shortened by using additives in the polyurethane mixture.

For all processing steps in which unhardened polyurethane mixtures are used, appropriate ventilation must be provided for the resulting gases, which are harmful to health.

After the second plastic layer has hardened, the workpiece may be further processed, for example by punching, sawing, or cutting, and deforming. Biothan 1784s is easily thermoformable for up to two weeks after the polymer has hardened. Full hardening may be accelerated by resintering at 80° C.

Plastics having an integrated digital image may be used, for example, in the design field for producing fashion articles such as handbags or other design formwork, or for everyday items in which both sides of the plastic are exposed to external stresses.

B) Plastic having a Fixed Digital Image, Without a Second Protective Layer:

Such a plastic is produced analogously to A) until the digital image is interlinked in the upper plastic acceptor layer. In some fields of application it is sufficient to protect the digital image at the top side, and protection from moisture (for ink jet printing) at the bottom side of the digital image is not necessary due to design reasons. An example of such is the casing for a computer, for example a Macintosh, or other transparent or nontransparent device casings and other articles. The production of veneers represents another field of application.

C) Plastic on a Base Layer:

Such a plastic is produced analogously to A). However, the substrate for the adhesive layer is a permanent carrier (base layer) and is preferably composed of the same Biothan 1784s material or a material with similar properties. However, other material combinations are also possible. The permanent carrier layer protects the digital image embedded in the image receptor layer from moisture, and likewise is thermoplastically deformable. Examples of fields of application are the manufacture of mobile phone casings, fashion articles, or everyday items.

The plastics produced under Example 1 have the advantage, among others, that costly injection molding processes may be avoided.

Example 2

Production of a Soft, Flexible Plastic Having a Fixed Digital Image

A) Plastic Having a Fixed Digital Image and a Second Polymer Layer on the Reverse Side of the Digital Image:

The production procedure is the same as described under Example 1. To obtain a soft, flexible plastic, a mixture of the polyurethane component Biothan 1784s and its hardener component Biodur 330 is prepared in a 1:1 ratio. Alternatively, a mixture of the polyurethane component Biothan 1770 and its hardener component Biodur 330 in a 1:1 ratio is possible. All components are available from Alpina GmbH. The hardening time for the plastic, without further hardening accelerator additives, is approximately one hour.

After hardening, these plastic mixtures are bound somewhat more strongly to the temporary polyester carrier. To allow this carrier to be removed without defects, the plastic together with the temporary carrier must be cooled to approximately 8° C. to 4° C. The carrier may then be removed by peeling from the adhesive layer bearing the digital image and interlinked in the plastic acceptor layer. When water-soluble printer inks are used, here as well a second protective layer, applied to the side exposed by peeling the temporary carrier, and preferably composed of the same polyurethane mixture as described above, is advantageous.

The plastic produced in this manner having an integrated digital image is highly flexible. When Biothan 1784s is used, the plastic is also very ductile, which is not possible when Biothan 1770 is used. The plastic under discussion may then be punched, sawed, cut, etc., and may also be glued to flexible surfaces such as fabric or leather, for example. Fields of application are in the area of design, as protective layers or everyday items, in the shoe industry, or in the manufacture of iPod shells.

B) Plastic Having a Fixed Digital Image, Without a Second Protective Layer:

This plastic is produced analogously to A), without applying a second protective layer.

The fields of application are similar to the above. For these plastics, gluing to fabric, leather, or other materials is particularly advantageous. However, fields of application are possible in which low elasticity is required.

C) Plastic on a Base Layer (Permanent Carrier):

This plastic is produced analogously to A), except that a base layer is used which preferably is composed of the same material already used, or from a similar material having similar properties. However, a different material combination is also possible. This base layer is likewise flexible, and optionally is readily ductile. The base layer protects the underside of the digital image from moisture. Fields of application are similar to those in A) and B).

Example 3

Production of a Soft, Flexible, and Ductile Plastic Having a Fixed Digital Image The production procedure is the same as described under Example 1. Used as adhesive layer is a pure cellulose-2-acetate layer (99.5% by weight) together with anionic surfactants (0.5% by weight) which have been dissolved in acetone and applied to a substrate. The adhesive layer may be imprinted after evaporation of the acetone.

Cellulose-2-acetate and anionic surfactants were obtained from Carl Roth GmbH, Karlsruhe.

For a plastic having these properties, a polyurethane/silicone mixture in a 3:1 ratio is prepared. First the polyurethane mixture is prepared from the polyurethane component Biothan 1784s and its hardener component Biodur 330 in a 1:1 ratio.

As silicone component the silicone Köraform A42 is used since, unlike many other silicones, it is transparent. The silicone component is mixed with its hardener component in a 1:10 ratio. The polyurethane mixture and silicone mixture are then mixed in a 3:1 ratio and degassed under vacuum. The mixture exhibits higher viscosity properties than its individual components, and must be spread onto the temporary carrier (substrate). In this respect there is less possibility of reintroducing air bubbles than with more liquid mixtures. However, it is still practical to perform degassing under vacuum after the spreading. In this case degassing directly after mixing the polyurethane and silicone components is absolutely necessary, and cannot be optionally omitted (as is the case for Examples 1 and 2), since the plastic mixture is relatively more difficult to degas on account of its viscosity.

All components are available from Alpina GmbH.

Without further additives, the hardening time for the copolymer mixture is approximately one hour. However, it is more advantageous to peel the temporary polyester carrier film from the adhesive layer, bearing the digital image and interlinked in the plastic acceptor layer, only after 3-4 hours have elapsed since the polymerization, and at 4° C.

The plastic produced in this manner having an integrated digital image is soft, highly flexible, and elastically ductile. Upon elastic stretching the digital image follows the motion of the plastic, and when the plastic subsequently contracts the digital image returns to its original position without showing cracks. Even in the stretched state, the image is so uniformly and finely stretched that no uneven areas or defects are identifiable.

The plastic under discussion may then be punched, sawed, cut, etc. Gluing to components which are identical or similar on a materially qualitative basis is possible.

The extent of the ductility depends on the composition of the materials.

The limiting factor for uniform, defect-free ductility of the digital image is the plastic itself. Examples of possible fields of application are elastic coatings of objects, or in the clothing industry.

Example 4

Production of a Polyurethane Foam Having a Fixed Digital Image

The production of a polyurethane foam having an abrasion-resistant digital image initially proceeds in the same manner as for the production of the polyurethane/silicone copolymer under Example 3. Extensive air inclusions (air bubbles) are introduced into this copolymer mixture as the result of stirring. As an alternative, in particular in the commercial sector, gas-generating (usually $CO_2$-releasing) additives may be added to the copolymer mixture.

The polyurethane/silicone mixture used here, described under Example 3, has such viscous properties that the introduced air bubbles remain incorporated until the polymerization, resulting in formation of a homogeneous polyurethane foam.

To impart a uniform layer thickness to the foam, it is advantageous to delimit the upper and lower sides by an adhesive layer, bearing a digital image, on a temporary carrier film. The polymerization time is approximately one hour. The temporary polyester carrier may likewise be removed approximately 3-4 hours after the polymerization by peeling, preferably at 4° C. The interlinked digital image is present in good quality, since on their surfaces (on both the top and bottom sides) polyurethane foams tend to form a thin, homogeneous layer of similar material composition (no demixing) without gas bubbles, so that the interlinked digital image is generally not flawed with uneven areas.

Example 5

Production of a Solid, Nonthermoformable Plastic Having a Fixed Digital Image

Similarly as described under Example 1, instead of using polyurethane components a solid plastic having an embedded digital image may be produced from epoxy resins.

For this purpose, analogously to Example 1 a prepolymerized epoxy resin polymer component together with its corresponding hardener component is mixed in a 1:1 ratio. Both components are commercially available from Modulor. The polymerization lasts approximately 30 minutes. The substrate may then be removed from the fixed adhesive layer, bearing a digital image and embedded in the image receptor layer, by peeling at room temperature. The digital image is interlinked very strongly in the epoxy resin macromolecule. Epoxy resins cannot be thermoplastically deformed. They find application, for example, in mold construction, as well as in boat building or model construction, among other uses.

Example 6

Production of a Plastic Having a Three-Dimensional Image Structure

A layer composed of cellulose-2-acetate (60% by weight), polymethylmethacrylate (PMMA, 39.5% by weight), and anionic surfactants (0.5% by weight) is used as adhesive layer. Cellulose-2-acetate and anionic surfactants were obtained from Carl Roth GmbH, Karlsruhe. PMMA was obtained from Modulor, Berlin. The components were dissolved together in acetone and applied to a substrate. The adhesive layer may be imprinted after evaporation of the acetone.

To produce a three-dimensional digital image in the plastic it is necessary to divide the image information over various consecutive levels. Each level contains its own explicit image information. In addition, special effects such as, for example, a magnifying effect or the like may be obtained. For example, a digital photograph for a gallery may be anchored in three dimensions and provided with effects in various levels of the plastic. Far-reaching fields of application are found in particular in the manufacture of veneers having a spatial effect, for example for the automotive industry, in shipbuilding and aircraft construction, or also in the furniture industry.

The individual levels of the plastic having a digital image are first produced as described under Example 1. The production is preferably carried out using a polyester substrate together with an adhesive layer, but may also be carried out using a permanent carrier (base layer). The individual layers may be provided parallel to one another, and in some cases may be interposed. It is advisable to successively glue in one work operation all necessary veneer or image levels to the polymer components that are already used, thus forming a homogeneous layer. After the polymerization the polymer layer having the three-dimensional digital image divided over multiple levels may be further processed, for example by sawing to length and carrying out thermoplastic deformation or the like.

Example 7

Production of a Three-Dimensional Object Having a Complex Design and Containing Digital Images that are Present on Many Different Levels in Various Orientations The adhesive layer from Example 6 was used.

The application areas for objects having such a complex design and making use of optical effects for three-dimensionality are found in particular in the design field, for example in the furniture industry, in model construction, and other fields.

The plastics having a digital image produced under Example 1, preferably as a single layer without the second protective layer (although the second layer is possible), may first be twisted, plastically stretched, bent, or otherwise deformed. In this manner the digital image is provided in various levels with different orientations. The structure produced in this manner may be repoured in a plastic that is qualitatively the same (or similar) to form a new three-dimensional object having a complex design.

This plastic object as well may be further processed.

Although patented material composite systems may also be folded in three dimensions, due to the material stresses which occur they cannot be similarly deformed in three dimensions; in particular stretching and twisting are critical for such systems. In addition, for optical reasons repouring in plastic is not possible.

Other patented methods for transferring digital images to plastic likewise show limited possibilities for deformation, since the digital images transferred in this manner adhere only indirectly to the plastic surface and would come loose upon stretching, for example.

In addition, the use of adhesive layers composed of another material (different plastic layers converted by sublimation) for repouring likewise results in nonhomogeneity of the plastic, as well as optical defects.

Example 8

Production of a Three-Dimensional Image

A copolymer of gelatin-containing polyols (20% by weight) and polyurethane (20% by weight), obtained by the polymerization of polyisocyanates (hardener 60% by weight), is used as adhesive layer.

Biothan 1784s from Alpina GmbH was used as polyurethane, and the isocyanate hardener Biodur 330 was likewise obtained from Alpina GmbH. Gelatin-containing polyols are currently not a standard offering in the chemical trade, and their production must be specially commissioned. The adhesive layer may be imprinted after the polymerization, although the water-soluble ink/pigment takes some time to dry.

These adhesive layers do not require a substrate since they have sufficient stability per se.

To produce a three-dimensional image in the plastic, the image information must be divided over various consecutive levels. Each level contains its own explicit image information which contributes to a three-dimensional effect. In addition, special effects such as, for example, a magnifying effect or wide-angle or zoom effects may be created. For example, a digital photograph for a gallery may be anchored in three dimensions and provided with effects in a plastic layer in such a way that the viewer has the impression of being drawn into the image.

Use of plastics from the class of duroplasts is suitable for such objects, since the resulting relatively thin plastic plates may also have fairly large surface areas and still remain very stable. Due to the good optical characteristics and the UV resistance of PUR compounds imparted by additives, use of plastics is very advantageous.

The individual plastic layers having a digital image are first produced using the method described here. The various image-bearing levels may be simultaneously produced, and then successively bonded to one another in one step with assistance from the polymer used. Lastly, it is important for the resulting plastic layer to be materially homogeneous to avoid creation of optical defects.

Example 9

Production of Mobile Phone Shells

In this example it is preferred to use thermoplastically deformable plastics (PP, PE, PVC) or polycarbonates (PC) and polyurethane (PUR). Use of permanent carriers, which in this case are present as a thin film, is particularly suitable for producing mobile phone shells. The simple, rapid process sequence is advantageous. The permanent carrier represents the subsequent lower side, and protects the digital print from external influences. The adhesive layer together with the corresponding binder is applied thereto.

A layer composed of methylcellulose (40% by weight) and plastic powder (PP, PE, PVC, or others having a particle size of approximately 50 µm, 60% by weight) is used as adhesive layer. The methylcellulose is first dissolved in water, and the plastic powder is incorporated. The methylcellulose is available from Carl Roth, Karlsruhe. The plastic powder must be produced by contract grinding services. The mixture is applied to the permanent carrier (the substrate) and dried. The adhesive layer may then be imprinted. After the adhesive layer is imprinted, a plastic layer approximately 200-300 µm thick is extruded. Heat generation causes the image to fuse to the applied, thicker plastic layer. The molds for the mobile phone shells are punched from the plates thus produced, and are thermoplastically deformed to the final shape. Although here as well the production of a closing mechanism for the shell represents an additional expenditure of effort, this method is an alternative to the costly injection molding process, in particular when individual small production runs are involved.

As an alternative to the adhesive layer described above, layers of copolymers of cellulose-2-acetate with thermoplastic plastic polymers may be used. The adhesive layer from Example 6 may also be used.

Example 10

Production of a High-Quality Veneer with a Three-Dimensional Effect for the Furniture Industry, Consoles and Trim in the Automotive Industry, Style and Design Products, or Moldings for Technical Equipment The veneer is composed of a series of various successive image receptor layers, each containing different image information. This image information may be differentiated by color or by shape, may be transparent, luminescent, or opaque, may contain bright or muted colors, may alternate the optical characteristics within a layer or over multiple layers, and much more. The interplay of all these factors results in the production of a plastic veneer with completely new design possibilities which may greatly enhance the appearance of an article, but which of course also allow naturally occurring design patterns such as burled wood veneer to be realistically reproduced, thus imparting a luxurious appearance.

Plastics which may be used for veneers include on the one hand polyurethanes, provided that they are thermoplastically deformable at least to a limited extent.

However, many other classes of plastic may also be used. Polyurethanes have good optical properties, and with corresponding additives are UV-resistant.

The image transfer layers produced in the described method may be produced simultaneously and successively bonded to one another in one step, preferably by means of the polymer used.

The veneers may then acquire their final shape by sawing, punching, etc., and thermoplastic deformation.

The adhesive layers from Examples 3, 6, or 8, with appropriate processing, may be used as adhesive layers.

Example 11

Production of an Elastically Flexible iPod Protective Shell Having a Fixed Image For this method a permanent transparent carrier made of silicone is used which is subsequently used as the outer skin. Since silicone by its nature has self-separating characteristics, an adhesive layer must be used which is able to react with the $CH_3$ groups of the silicone, for which purpose additives (SDS) are added. An adhesive layer is first produced which contains corresponding ions. An elastomeric polymer based on gelatin is used as adhesive layer. A melt solution of gelatin with water, glycerin, and sodium lauryl sulfate (SDS) is first applied to a substrate which may be subsequently separated, and is dried. The composition is gelatin (80% by weight), glycerin (10% by weight), and SDS (10% by weight). A liquid silicone layer is then applied and polymerized. Hydrogen bridge bonds which anchor the adhesive layer in the silicone are produced between the methyl groups of the silicone and the strong anion of the SDS. The substrate is removed, and the adhesive layer which is thus exposed may be imprinted.

After imprinting, molds for processing into iPod shells are punched from this film (composed of transparent silicone carrier and adhesive layer).

The iPod shells are manufactured in the in-mold injection molding process. For this purpose the punched film is placed in the injection mold with the printed side facing inward. For the injection molding, during the polymerization the adhesive layer is likewise anchored to the inner silicone layer via strong hydrogen bridge bonds. Gelatin, glycerin, and SDS are available from Carl Roth, Karlsruhe. Silicone and hardener (ALPA-SIL) are available from Alpina GmbH.

Example 12

Production of a Ductile Latex Layer Having Fixed Digital Print for the Clothing Industry and Other Fields of Application Previous digital print on ductile latex-coated materials does not exhibit good adhesion characteristics. Wear occurs quickly, particularly at locations subject to intense stress.

The method described here gives the fixed digital image a solid hold, in particular on elastic and ductile polymers. The digital image fixed in this manner has exactly the same stretchability as the polymer itself, and after the stretching is discontinued the digital image together with the polymer returns to its original position.

A layer composed of methylcellulose is used as adhesive layer. The methylcellulose is first dissolved in water and is applied to a detachable substrate (polyester, for example). Methylcellulose is available from Carl Roth, Karlsruhe. The adhesive layer may be imprinted after drying. The image receptor layer is applied as a still-liquid latex mixture, and is generally solidified by removal of water or by other methods. The substrate is removed. The resulting latex layer having a fixed digital image may be processed beforehand, for example by gluing to an elastic material.

However, it is also possible to apply a further latex layer as base layer to the reverse side of the image receptor layer.

To prevent water-soluble inks/pigments from running upon penetration of the latex milk, a very thin latex layer may first be applied which dries relatively quickly without resulting in running. A thicker latex layer may be applied thereto.

Example 13

Production of a Beverage Bottle or Other Hollow Body Having a Fixed Image in the Container Walls The composition of the adhesive layer depends on the plastic used, from which the hollow body is fabricated.

For processing of polymethylmethacrylate (PMMA) an adhesive layer composed of cellulose-2-acetate (60% by weight), polymethylmethacrylate (PMMA, 39.5% by weight), and anionic surfactants (0.5% by weight) may be used (see Example 6).

For processing of polyethylene (PE) or polypropylene (PP) an adhesive layer composed of polyethylene oxide is suitable. Polyethylene oxide together with thermoplastic compounds is able to form other thermoplasts, and is printable. Polyethylene oxide may be obtained from Carl Roth GmbH.

The method described here is advantageously suitable for producing beverage bottles or other hollow bodies having a fixed decorative image, using blow molding or similar processes.

The plastics which may be used for this purpose belong to the class of thermoplastically deformable polymers. One polymer frequently used for producing beverage bottles for holding potable liquids is polyethylene, which is intended here to represent by way of example a large number of thermoplastic plastics that are usable for this purpose. The plastics polyethylene (PE) and polypropylene (PP) are the most frequently used plastics in the manufacture of beverage bottles. On the other hand, polymethylmethacrylate (PMMA) is frequently used in the design field. Many other everyday articles are manufactured from polyvinyl chloride (PVC). These materials are representative of a large number of thermoplastically deformable polymers from which beverage bottles or other hollow bodies may be produced according to the example described here.

A) It is advisable to use a permanent carrier for the adhesive layer when relatively thin-walled containers are to be produced. The carrier material should preferably be made of polyethylene and be present as a film of a given thickness. The adhesive layer together with the corresponding binder, which also contains the digital image, is applied thereto. When the image receptor layer is applied in the form of a heated polyethylene melt, it may be necessary to briefly cool the carrier film to prevent it from melting. However, it must be ensured that the applied polyethylene melt has sufficient time to diffuse through the adhesive layer. The adhesive layer itself should also have a given layer thickness. Polyethylene, the same as other thermoplastically deformable plastics, contains no crosslinks. For this reason the formation of a strong diffusion layer is extremely important to provide high-quality anchoring of the digital image in the macromolecule.

B) It is advisable to use a temporary carrier when the container has relatively thick walls. In this case a carrier material made of polyester would be practical, since this material tolerates high temperatures. The image receptor layer in the form of a heated polyethylene melt is applied to the adhesive layer. Here as well it is important for the adhesive layer to have a given layer thickness, and for the polymer to be able to diffuse through same before the polymerization in order to obtain a pronounced diffusion layer. After the plastic solidifies and the temporary carrier is peeled off, a second polyethylene melt is applied to the plastic surface thus exposed.

C) The adhesive layer together with the corresponding binder, which also contains the digital image, is applied to the permanent carrier, which is preferably made of polyethylene. The subsequent, still nonliquid image receptor layer is applied thereto, preferably in the form of a fairly thick polyethylene film, by lamination or other methods. In this case the subsequent processing must ensure that sufficient energy is supplied to initiate intermolecular interactions between the binder of the adhesive layer and the plastic layers.

The plastics having a fixed digital image which are produced under A), B), and C) may be further processed in the same manner. The films are first formed into a tube of appropriate diameter and longitudinally welded using a hot air jet or other technique. This tube is then used in the blow molding process to produce a preform. The preform fabricated from the tube is conveyed from a flange-mounted tool into a shape-imparting blowing mold. A mandrel is then introduced into the tube from above, and hot compressed air is passed through same and pressed into the tube. The tube is inflated and matched to the shape of the blowing mold. In this manner the tube together with the digital image fixed therein is greatly stretched. The digital image is embedded in the macromolecule of the plastic in such a way that the digital image homogeneously follows the stretching. However, the elongation of the image must be taken into account for the digital print. The plastic cools. The blowing mold is opened and the bottle or container is ejected.

The resulting bottles and other hollow containers have digital print which is integrated into the interior of the plastic. The digital print incorporated into the macromolecule is protected from both the interior and the exterior by a plastic layer. The digital print does not come into contact internally with the liquid present in the bottle/container, nor is it externally accessible. Completely new designs may be created by use of this method. On the other hand, imprinting or coating with films containing a decorative image is no longer necessary.

If the beverage bottles or hollow bodies are to be recycled, in this case it is advantageous that no composite systems are present, and the materially homogeneous everyday articles do not incur extra costs for additional separation processes.

Example 14

Production of a PET Bottle Having a Design Obtainable by Blow Molding

PET bottles in the beverage industry are having an increasing impact on everyday life. They are blown in the blow molding process from a previously fabricated preform. In this manner the plastic surface is significantly stretched. For bottles having a complex shape, complicated surface structures are also produced. To allow these products to still be provided with design images, emblems, and marketing elements, bands and labels are applied after filling. Some bands are produced from shrink film, which under the effect of heat reproduces the shape therebeneath. However, this is successful only for very rough-textured structures.

Another possibility for applying a design image is to sleeve the preform with a design film, which in the subsequent blow molding process is inflated together with the bottle. An advantage of this method is that the design encompasses the entire bottle, and is adapted to the shape of even complex structures. For these design films the method described here is suitable for fixing images in plastics. The images are readily ductile, and risk of running is very low since the pigment particles themselves do not melt.

Use of this method offers the further advantage that the inks/pigments used are generally water-soluble. Heretofore, bands have been imprinted with plastic pigments. Since PET is a relatively expensive raw material (manufacturing a one-liter bottle costs approximately 12 cents, of which PET costs account for 10 cents), efforts have been made to extract the pigment from the bands during recycling and to return the PET in the film back to the PET cycle. Isopropanol has been used for this purpose in the past. Use of the method for fixing images in plastics allows the pigment to be extracted from the bands by washing in water.

A layer composed of polyethylene oxide (PEO, 99% by weight) and anionic surfactants (1% by weight) is used as adhesive layer. PEO is available from Carl Roth, Karlsruhe. The polymer and the surfactants are first dissolved in water and applied as a layer to a PET film (polyethylene terephthalate). The adhesive layer may be imprinted after drying. The imprinted film in tube form together with the image is then sleeved inwardly onto the preform, from which the final bottle is subsequently blown in the blow molding process. Since PEO and PET have similar melting temperatures, the stretching characteristics of the adhesive layer are very similar to those of the PET film and of the PET preform therebeneath. In addition, melting of the layers into one another is achieved as a result of the processing temperatures between the flow point and the melting temperature.

During subsequent recycling, after the bottles are shredded the PEO adhesive layer and the pigments contained therein may be washed out with water. The PET is then free of both adhesive layer polymer and pigment.

Example 15

Production of a Heat-Transferable Design Film for Furniture, Everyday Articles, Etc., or for Arts and Crafts Not including heat-transferable wood veneers in the furniture industry, the main representatives are surface designs which are first printed on paper and then coated with a plastic layer. This variant has the disadvantage that the underlying piece of furniture must have already acquired its final shape, since the plastic-paper plate has very little deformability. Apart from a plastic plate containing an embedded image, heat-transfer of an image-bearing film would be more advantageous. After the plate is fused to the film it may easily be subjected to further thermoplastic deformation. In other respects, heat transfer of an image-bearing film onto an object represents a further application possibility of the method in the design field.

Since the adhesive layer may be imprinted using standard ink jet printers, this method is also suitable for arts and crafts.

In this case the liquid plastic for the image receptor layer is produced from the adhesive layer itself. The composition of the adhesive layer depends on the substrate to which the adhesive layer is to be fused.

A layer composed of cellulose-2-acetate (60% by weight), polymethylmethacrylate (PMMA, 39.5% by weight), and anionic surfactants (0.5% by weight) as in Example 6 is a suitable adhesive layer.

Another suitable adhesive layer is a layer composed of methylcellulose (40% by weight) and plastic powder (PP, PE, PVC, or other material having a particle size of approximately 50 μm, 60% by weight); see Example 9. The selection of the plastic powder components depends on the compatibility with the particular substrate. White or other colored pigments represent further possible additives for the particular adhesive layer.

The carrier film for the adhesive layer should have good haptic properties. It is also helpful for the films to be finely perforated to prevent bubble formation between the film and the object during heat transfer.

After the adhesive layer is imprinted and the image is dried, the film together with the image is heat-transferred facing the object. The plastic components in the adhesive layer are melted and form a melt compound with the substrate. The carrier film then acts as a protective layer for the image.

Example 16

Fixing Images in Textiles

Images May be Fixed in Textiles in Two Different Ways:
1) The textile fibers (provided that synthetic fibers are involved) are partially melted (chemically or by heat) and incorporate the previously imprinted adhesive layer therein, so that the textile fibers themselves represent the image receptor layer.
2) An adhesive layer is applied to the fabric (possible for both natural and synthetic fibers). The fabric is imprinted and is then brought into contact with the liquid plastic, which forms the image receptor layer.

The most frequently used synthetic fibers are represented by polyacrylics, polyamides, polyesters, polyolefins, polyurethanes, polychlorides, elastanes, silicones, as well as many other polymers.

Fabrics made of plastic fibers may be produced from the same types of fibers or from combinations of various synthetic fibers. Use of synthetic fibers composed of copolymers is also possible. Materials may also be produced as laminates, in which case they are composed of various material layers. Synthetic and natural materials represent a further variant having a polymer coating on their surface.

Natural fibers are composed of plant fibers (cellulose: linen, jute, hemp, sisal) and animal fibers (proteins: wool, llama, alpaca, mohair, cashmere, silk). Many materials are fiber mixtures of cellulose fibers with one another, of protein fibers with one another, or of cellulose and protein fibers with one another. Many fabrics are composed of mixtures of natural and synthetic fibers.

1) The synthetic fiber fabric composed of polymer fibers must first be melted, at least partially, on the surface. Depending on the type of polymer, this may be achieved either by heating or by use of acids or bases or treatment with solvents, which are applied to the plastic fabric by spraying or other techniques. It is also possible to apply acids or bases, or solvents, to the adhesive layer with subsequent contact with the surface of the plastic fabric. For mixed plastic fabrics, selection of the method for liquefying the plastic depends on the primary fiber component of the plastic fabric. The image-bearing adhesive layer, which is specific for the polymer, is brought into contact with the surface of the plastic fabric before, during, or after the liquefaction. The partially liquefied plastic bonds with the adhesive layer. Depending on the type of plastic, the polymer of the synthetic fiber solidifies by cooling, evaporation of the solvent, or neutralization of the acid or base. The image is embedded in the synthetic fiber.

Representative Example:

The predominant fiber of the fabric is composed of polymethylmethacrylate (PMMA). The adhesive layer is composed of cellulose-2-acetate (60% by weight), polymethylmethacrylate (PMMA, 39.5% by weight), and anionic surfactants (0.5% by weight) as in Example 6. The surface of the synthetic fiber is dissolved by spraying on acetone, and the imprinted adhesive layer is applied to the synthetic fiber fabric with light pressure and is fused to the fiber. (Both the fabric and the adhesive layer are dissolved.) The acetone evaporates, and the fiber together with the image is transformed to the solid state. A protective layer (composed of PMMA, for example) may then optionally be sprayed on.

2) An adhesive layer is applied to the fibers of the fabric (practically all fabrics are treatable). The fibers of the fabric act as substrate.

The substrate is imprinted, and a liquid plastic is then applied which bonds with the imprinted adhesive layer and forms the image receptor layer.

Representative Example:

An adhesive layer composed of gelatin is applied to a mixed fabric. For this purpose an aqueous gelatin solution (gelatin 100% by weight, dry) is sprayed onto the fabric and fixed with formaldehyde. The adhesive layer may be imprinted after drying.

After the material is imprinted a thin polyurethane film, which represents the image receptor layer, is applied to the adhesive layer.

Examples of Compositions of the Adhesive Layers by Weight Fraction:

Example 17

A pure cellulose-2-acetate layer is used as adhesive layer. The weight fraction is 100%. The cellulose-2-acetate is first completely dissolved in acetone and then applied to a carrier film (composed of PVC, for example) by spraying. As soon as the acetone layer has evaporated, a film composed of cellulose-2-acetate is obtained which is ductile and thermoplastically deformable. The adhesive layer may be imprinted. The resulting adhesive layer should not have a thickness less than 10 microns, since otherwise the hydrophilic properties are not strong enough for water-soluble inks/pigments. At the same time, cellulose-2-acetate is able to form stable bonds with other plastics. This adhesive layer is particularly suitable for use for thermoplastic polymers.

Example 18

Used as adhesive layer is a pure layer composed of polyethylene oxide which is first dissolved in water (100% by weight). After application to a carrier film by spraying, the water must be evaporated. The adhesive layer may then be imprinted. At the same time, the adhesive layer is able to thermoplastically bond with other plastic polymers, and is thermoplastically deformable. However, the adhesive layer is also suitable for use for polyurethanes, epoxy resins, and polyesters.

Example 19

Used as adhesive layer is a layer composed of PMMA (hydrophobic component, 40% by weight) and cellulose-2-acetate (60% by weight) as hydrophilic component, which, however, is able to bond with thermoplastic polymers. Both components are dissolved in acetone, and are applied to a carrier film by spraying. After the acetone has evaporated, a copolymer film composed of PMMA and cellulose-2-acetate is present which is thermoplastically deformable and bonds well with many thermoplasts.

Example 20

A copolymer layer composed of a gelatin derivative and polyurethane is used as adhesive layer. The gelatin together with the polyurethane is processed by polymerization of polyisocyanates with gelatin-containing polyols. The weight fraction of the gelatin is 60%, and of the polyurethane, 40%. This adhesive layer may be imprinted with water-soluble inks/pigments after the polymerization. The adhesive layer is particularly suitable for processing with polyurethanes.

Example 21

Used as adhesive layer is a gelatin elastomer produced by treatment of gelatin (60% by weight) with an acid or a base and subsequent treatment with dimethyl sulfate and cresol. Polyglycerin (5%) is added to this rubberlike polymer, and butadiene acrylonitrile rubber (35%) is mixed in.

This adhesive layer has hydrophilic properties, is highly elastic, and is used in the processing of elastomers.

Example 22

Possible Processing Steps for Producing the Adhesive Layers from One or More Components (Also with Different Physical Properties)

a. The components are dissolved in the same solvent, using water, for example:
   Carboxymethyl methylcellulose and polyacrylamide or polyethylene oxide
   Using acetone, for example: cellulose-2-acetate and polyacrylate and polymethacrylate, or polyvinyl acetate.
b. One component is dissolved in a solvent, and the second component is incorporated as a powder
   For example, carboxymethyl methylcellulose is dissolved in water, and PMMA or other thermoplasts are incorporated as an (insoluble) powder (the preferred powder size is 50-150 microns; other sizes are possible).
c. Various solvents (in which the components have been dissolved) may be mixed together
   For example, mixtures of acetone, ethanol, methanol, and water with one another are possible.
   A number of thermoplasts preferentially require a nonpolar organic solvent (insoluble in water or polar organic solvents).
d. The fine powder(s) of one or more components are applied to the carrier as a plastisol (a mixture of powdered thermoplastic polymer and softener, optionally including fillers, blowing agents, and additives). Upon heating, the polymer dissolves in the softener and forms a film of highly viscous consistency which is no longer flowable at room temperature. The plastisol may also be produced without a carrier; for example. the components may first be spread out and then fused as a film.
e. The components are fused together, and in the form of a melt are applied to the carrier by spraying, extrusion, or the like.
f. The components are applied as a dispersion.

The invention claimed is:

1. Method for fixing images in plastic moldings after generating an image on an adhesive layer, comprising:
   applying an image receptor layer of liquid plastic to the image which has been generated on the adhesive layer, wherein components of the adhesive layer are at least partially miscible with the liquid plastic when the image receptor layer is applied to the adhesive layer, and
   then converting the liquid plastic phase to a solid plastic phase.

2. Method according to claim 1, wherein after said applying, and after a contact time of at least one second between the image receptor layer and the adhesive layer, the liquid plastic phase is converted to the solid plastic phase.

3. Method according to claim 1, wherein the liquid plastic is a plastic melt.

4. Method according to claim 1, wherein the liquid plastic is a liquid, curable plastic.

5. Method according to claim 1, wherein the liquid plastic contains a solvent or a solvent mixture.

6. Method according to claim 1, wherein the liquid plastic contains hydrophilic or hydrophobic solvents.

7. Method according to claim 1, further comprising: removing an additional carrier located on a backside of the adhesive layer after the image receptor layer is converted to the solid plastic phase.

8. Method according to claim 1, wherein a volume of the liquid plastic is applied which is at least as great as a volume of the adhesive layer.

9. Method according to claim 7, further comprising: after removing the carrier, applying a base layer of plastic in place of the removed carrier.

10. Method according to claim 9, wherein the base layer is applied as a liquid plastic phase.

11. Method according to claim 9, wherein the base layer is applied as a solid plastic phase.

12. Method according to claim 1, wherein the adhesive layer contains at least one component which is at least partially soluble in the liquid plastic phase and/or enters into a chemical reaction with the plastic.

13. Method according to claim 1, wherein the adhesive layer is on a carrier, which is a commercially available polyester foil having a bonding layer as the adhesive layer.

14. Method according to claim 1, wherein the liquid plastic comprises at least one of a duroplastic, a thermoplastic, and an elastomeric plastic, which after the conversion to the solid plastic phase have transparent, nontransparent, translucent, or opaque optical characteristics and/or are colored.

15. Method according to claim 1, wherein the liquid plastic comprises a polyurethane.

16. Method according to claim 1, wherein the liquid plastic comprises a mixture of polyurethane and silicone.

17. Method according to claim 1, wherein the liquid plastic comprises an epoxide and polyester.

18. Method according to claim 1, wherein the liquid plastic comprises an aqueous polymer dispersion.

19. Method according to claim 1, wherein the liquid plastic comprises a polycarbonate.

20. Method according to claim 1, wherein the liquid plastic comprises polystyrene or polyalkylene.

21. Method according to claim 20, wherein the liquid plastic comprises at least one of polyethylene and polypropylene.

22. Method according to claim 1, wherein the liquid plastic comprises a polymer from the group of acrylic compounds.

23. Method according to claim 1, wherein an additional carrier is located on a backside of the adhesive layer, and thus acts as a base layer.

24. Method for fixing images in plastic moldings after generating an image on an adhesive layer, comprising:
   applying an image receptor layer as solid plastic to the image generated on the adhesive layer,
   then at least partially bringing the image receptor layer into a liquid phase, wherein components of the adhesive layer are at least partially miscible with the image receptor layer in the liquid phase, and
   then converting the liquid phase to a solid plastic phase.

25. Method according to claim 24, wherein the image receptor layer comprises a plastic which melts by heating.

26. Method according to claim 24, wherein the solid plastic is laminated or extruded onto the adhesive layer as a film.

\* \* \* \* \*